(12) United States Patent
Powers et al.

(10) Patent No.: US 6,839,441 B1
(45) Date of Patent: Jan. 4, 2005

(54) SOUND MIXING CONSOLE WITH MASTER CONTROL SECTION

(75) Inventors: Timothy Clay Powers, Dallas, TX (US); Howard Churchill Page, Addison, TX (US)

(73) Assignee: Showco, Inc., Lititz, PA (US)

( * ) Notice: Subject to any disclaimer, the term of this patent is extended or adjusted under 35 U.S.C. 154(b) by 0 days.

(21) Appl. No.: 09/009,235

(22) Filed: Jan. 20, 1998

(51) Int. Cl.[7] .............................................. H04B 1/00
(52) U.S. Cl. ...................................... 381/119; 381/123
(58) Field of Search .............................. 381/119, 123, 381/107, 108, 109; 369/3; 700/94

(56) References Cited

U.S. PATENT DOCUMENTS

| | | | |
|---|---|---|---|
| 3,982,071 A | 9/1976 | Weiss et al. ................. 381/119 |
| 4,479,240 A | 10/1984 | McKinley, Jr. ................ 381/80 |
| 4,635,288 A | 1/1987 | Stadius ........................ 381/119 |
| 4,677,674 A | 6/1987 | Snyder ......................... 381/58 |
| 4,879,751 A | 11/1989 | Franks et al. ............... 381/119 |
| 4,885,792 A | 12/1989 | Christensen et al. ........ 381/119 |
| 4,993,073 A | 2/1991 | Sparkes ....................... 381/119 |
| 5,054,077 A | 10/1991 | Suzuki ......................... 381/109 |
| 5,060,272 A | * 10/1991 | Suzuki ......................... 381/119 |
| 5,102,373 A | 4/1992 | Martinson et al. .......... 474/101 |
| 5,122,720 A | 6/1992 | Martinson et al. .......... 381/109 |
| 5,206,913 A | 4/1993 | Sims ............................ 381/103 |
| 5,212,733 A | 5/1993 | Devitt et al. ................ 381/119 |
| 5,239,458 A | 8/1993 | Suzuki ......................... 381/119 |
| 5,257,317 A | 10/1993 | Stavrou ....................... 381/119 |
| 5,268,964 A | 12/1993 | Watts .......................... 381/107 |
| 5,293,102 A | 3/1994 | Martinson et al. ............. 318/2 |
| 5,299,267 A | * 3/1994 | Nakamura .................... 381/119 |
| 5,402,501 A | 3/1995 | Silfvajt et al. .............. 381/119 |
| 5,420,933 A | * 5/1995 | Zampini et al. ............. 381/119 |
| 5,444,676 A | 8/1995 | Balsamo et al. ................ 369/4 |
| 5,444,789 A | * 8/1995 | Zampini et al. ............. 381/119 |
| 5,479,518 A | * 12/1995 | Zampini et al. ............. 381/119 |
| 5,623,551 A | 4/1997 | East et al. ................... 381/119 |
| 5,930,375 A | * 7/1999 | East et al. ................... 381/119 |
| 5,982,902 A | * 11/1999 | Terano ......................... 381/119 |
| 6,061,458 A | * 5/2000 | East et al. ................... 381/119 |

OTHER PUBLICATIONS

Technology, "Live Mixing and the Midi Fader".
Euphonix News, "New Systems for Post & Broadcast".
Euphonix News, "Digitally Controlled Studio System".
Euphonix News, "Digitally Controlled Audio Mixing System".
Yamaha, "Professional Audio Mixing Console, PM4000M".
Yamaha, "Professional Audio Mixing Console, PM3500 and PM3500M".
Virtua Digital Console.
Stage Tec, "The Art of Digital".
AMS NEVE, "The Libra Music Console".

(List continued on next page.)

*Primary Examiner*—Xu Mei
(74) *Attorney, Agent, or Firm*—Burns Doane Swecker & Mathis LLP

(57) ABSTRACT

A sound mixing control console used in live concert performances, etc., includes a master control section having motorized knobs for controlling variable parameters such as input gain, pan, frequency equalization and the like of individual input channels. Each of plural input channels includes a dedicated fader for controlling output level and a selector switch for applying the master control section to that channel for controlling other variable parameters besides output level. A memory subsystem stores and recalls the positions of the motorized knobs. When an input channel is selected, the knobs of the master control section assume positions corresponding to the current values of the variable parameters, which may then be adjusted manually and stored. Signal processing is carried out by digitally-controlled circuitry.

19 Claims, 3 Drawing Sheets

OTHER PUBLICATIONS

AMEK Technology Group.
Recall.
Cantus, "The Digital Audio Mixing Console System".
Series Twelve.
Solid State Logic, "Total Studio System".
Solid State Logic, "Digital Production System".
Broadway Soundcraft Technical Guide, "Digital Control of Analogue Audio".
Euphonix News, "System Overview".
Midas, "Live Performance Console".
AMS NEVE, "The Capricorn".

* cited by examiner

SOUND MIXING CONSOLE WITH MASTER CONTROL SECTION

FIELD OF THE INVENTION

The present invention relates to sound mixing equipment, and particularly to motorized control features for a computerized sound mixing control console.

DESCRIPTION OF RELATED ART

Automated sound mixing control consoles are known to include motorized faders for controlling the signal level of audio signals. The faders can be operated manually to set the desired signal levels, the movements of the faders being sensed, recorded and stored by electronic means. The faders can then be operated automatically by recalling stored data representing the movements of the faders, and applying the data to electronic motor controllers for driving the motorized faders. In this way, a complex mix of very many input channels can be rehearsed and recorded in parts, and then executed in its entirety. Automated sound mixing of this type is frequently employed for mixing a multi-track audio recording down to a stereo master recording, or for live mixing of a large concert event having very many input channels and plural stereo or monaural output mixes.

Motorized fader systems are shown, for example, in U.S. Pat. Nos. 5,102,373; 5,122,720; and 5,293,102 to Martinson et al; in U.S. Pat. Nos. 5,054,077; 5,060,272; and 5,239,458 to Suzuki. Alternatively, manual faders can be used to adjust the output amplitude of voltage-controlled amplifiers (VCAs), with the faders movements and positions being stored and data therefrom subsequently used to control the amplitude of VCAs as shown, for example, in U.S. Pat. No. 3,982,071 to Weiss et al; U.S. Pat. No. 4,885,792 to Christensen; U.S. Pat. No. 5,268,964 to Watts; and U.S. Pat. No. 5,402,501 to Silfvajt. As recognized by East in U.S. Pat. No. 5,623,551, the provision of motorized faders solves the problem of there being more faders than can be effectively operated at one time by a single operator. Stavrou, in U.S. Pat. No. 5,257,317; attempts to solve this problem by multiplexing a limited number of faders and other input channel controls to a larger number of audio input channels.

Most sound mixing systems also provide circuits for controlling other signal parameters for each input channel thereof, including input gain and attenuation, panoramic (pan) control of stereo placement, frequency equalization filters, and auxiliary signal send level controls. Sophisticated sound mixing systems may also provide dynamic signal processing circuits for each input channel such as a compressor/limiter and/or a gate, with signal level and other parametric controls being provided therefor. Further, plural signal paths can be selected so that each input signal can be routed through a sub-master section in addition to or instead of being routing directly to a master output, and can further be routed through one or more sound effect imparting circuits such as a reverberation unit or other such circuit, and to one or more auxiliary outputs such as a monitor mix or a direct output for audio recording, with level controls and/or panoramic controls being provided for such routing assignments for each input channel.

Automated systems for controlling audio signal parameters and routing assignments as described above are shown, for example, in U.S. Pat. No. 4,479,240 to McKinley Jr.; U.S. Pat. No. 4,635,288 to Stadius; U.S. Pat. No. 4,677,674 to Snyder; U.S. Pat. No. 4,879,751 to Franks; U.S. Pat. No. 4,993,073 to Sparkes; U.S. Pat. No. 5,206,913 to Sims; U.S. Pat. No. 5,212,733 to DeVitt; U.S. Pat. No. 5,257,317 to Silfvajt; and U.S. Pat. No. 5,444,676 to Balsamo. McKinley, Jr., for example, describes means for recording the positions of control elements used for setting various audio signal parameters, and further describes indicator means (a pair of LEDs) for showing an operator which way to adjust the control elements to manually restore them to a previously recorded position.

Franks and Silfvajt describe automated sound mixing systems including means for recording control element positions including routing switches, fader positions and control knob positions. Individual control knobs and faders for each input channel are provided with indicators to show an operator how to manually re-adjust the control elements to restore a sound mixing system to a previously recorded state. Using these automated systems, complex mixes can be rehearsed and recorded in parts, including fader movements to set levels, control knob movements to adjust other signal parameters, and routing assignment switching, and then the complex mix can be executed in its entirety as required for studio mix-down recording or live concert performance.

In most prior consoles, especially for live concert applications, it is customary to provide all control knobs and switches for all physical channels, and to provide visual or aural feedback to the operator for manually adjusting the control knobs to restore a previously recorded console set-up. Editing a complex mix is therefore complicated by the necessity to restore control elements to their stored positions prior to manually adjusting signal parameters. The common technique employing LED indicators as feedback devices to an operator is cumbersome owing to the amount of time and manipulation required to re-set control knobs to the desired positions. Other feedback means, such as video display indications or voice synthesized feedback, are functionally equivalent to LED feedback and offer no substantial improvement. Rotary control knobs could be motorized and driven the same as motorized faders, but the number of knobs provided on a professional sound mixing console for large-scale applications requires a prohibitively weighty and expensive number of motorized control knob mechanisms.

Studio consoles are usually laid-out in a new and unfamiliar fashion such that a new user has no immediate familiarity with the layout of controls. Further, there is the temptation to which many have yielded to "simplify" operation of the console by providing only one rotary control element for signal parameter adjustment and providing switches for selecting the parameter to be adjusted. This is done because the technology exists to do it cheaply using a rotary encoder that provides delta rotation values irrespective of actual position of the knob, and facilitates the digital control techniques for multiplexing a single control knob over a matrix of channels and adjustable parameters. Current values of the adjustable parameters are indicated by electronic display means. Live consoles tend to provide all knobs for all parameters of all channels, the knobs being active all of the time. Because of space requirements, all of the controls for a single input channel are laid-out in a vertical strip above the channel fader.

SUMMARY OF THE INVENTION

The preferred embodiments disclose a system and method for editing of previously stored console setups in a naturally understood manner, and to provide automated audio controls that respond in a naturally understood manner.

The preferred embodiments further disclose a sound mixing system comprising a sound mixing control console electronically coupled to audio signal processing circuits includes a plurality of audio signal input channels having adjustable input gain, adjustable frequency equalization in plural bands of audio frequencies, and adjustable signal level control; the system also including a plurality of output channels having adjustable output signal level control; the system providing electronic detection of moveable control element positions, the system further including an electronic memory sub-system; the sound mixing control console including plural front-panel control features for adjusting the signal levels of the input channels and of the output channels, and indicators showing the current state of input and output channel adjustable parameters; the console further including a master channel control section applicable to any one of the input channels of the sound mixing system; the master control section having a plurality of motorized control features for adjusting various parameters of an audio input signal, including at least input gain and frequency equalization; wherein the system can store plural set-ups of the control console in the electronic memory sub-system; each set-up including at least the input gain, frequency equalization parameters, and signal level of the input channels and further including signal levels of output channels; each of the plural set-ups being recallable to restore the audio signal processing parameters as set by the motorized control features of the console; the console further comprising a selection control for each input channel that applies the master control section of the console to the selected input channel whereby selection of the input channel causes the electronic memory sub-system to read out stored signal processing parameters for that channel to a motor control sub-system of the master control section which then drives the motorized control features thereof to positions that correspond to the stored signal processing parameters.

Therefore, and in accordance with the exemplary embodiment, instead of providing every knob on every channel, with the knob being active in controlling its associated circuit parameter all of time, there is provided one set of control knobs, switches and associated indicators, and a selector switch associated with each group of individual input channel controls so that pressing the selector switch for a particular channel applies the one set of control knobs to the selected channel. The control knobs are motorized so that in the time it takes to turn one's attention from the channel selector switch, the knobs move quickly to positions corresponding to the current circuit parameters. The control knobs are then active for controlling their associated circuit parameters in a naturally understood manner, and may remain active until another input channel is selected.

DETAILED DESCRIPTION

Figure 1:
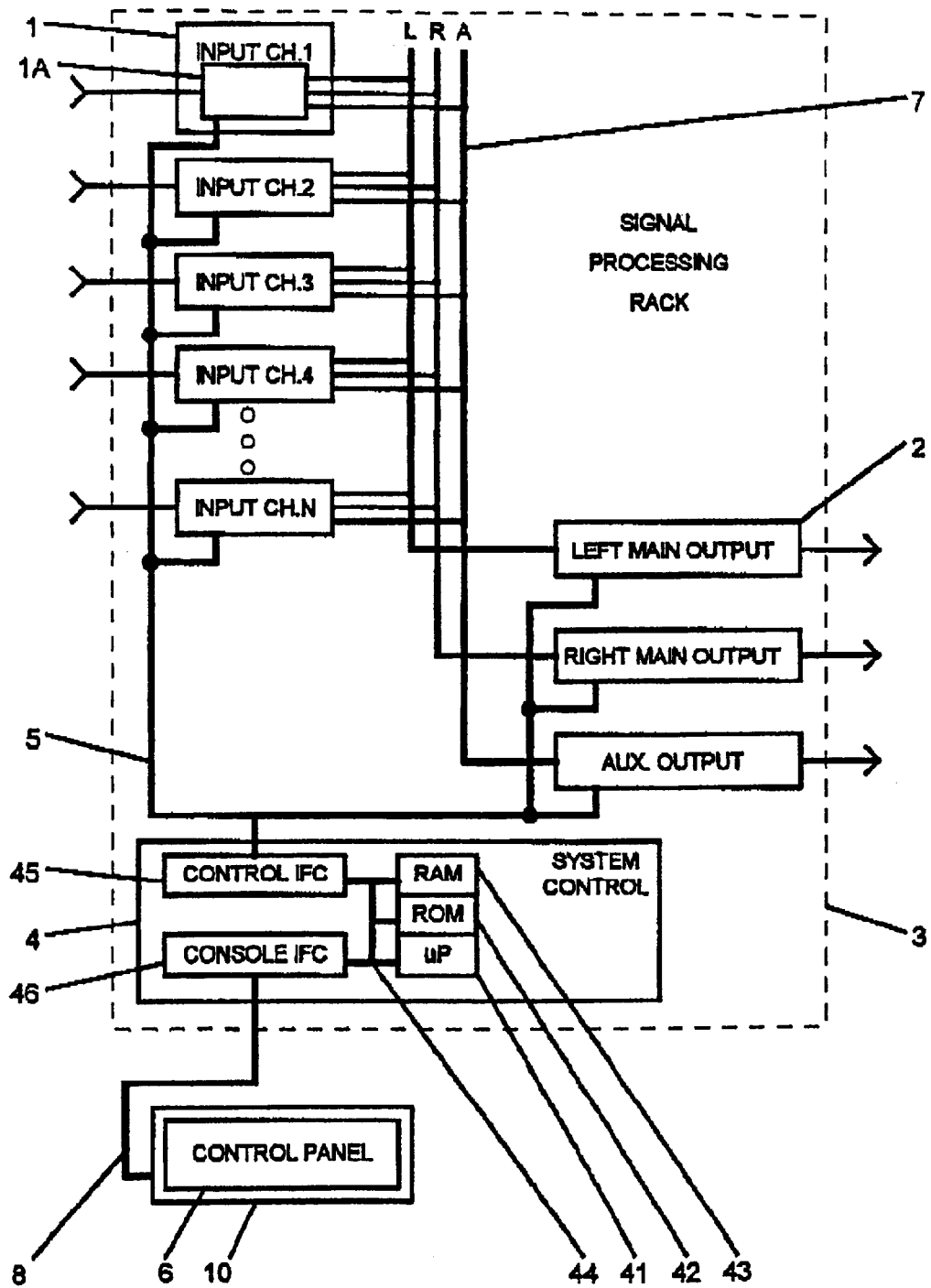
FIG. 1 is a schematic block diagram of a typical sound mixing system.

A sound mixing system as shown in FIG. 1 includes plural input channels 1 for receiving audio frequency analog electrical signals from microphones or electrical musical instruments and the like, and further includes at least one but preferably plural output channels 2 for transmitting audio frequency analog electrical signals. The input and output channels include the electronic signal processing circuits or units 1A which preferably comprise computer-controlled digital signal processor (DSP) devices and are preferably housed in an audio rack enclosure 3 which can be located in proximity to the signal sources, power source, and/or power amplifiers and loudspeakers of a sound reinforcement system. Alternatively, digitally-controlled analog audio circuits may be used for the input and output channels. The signal processing circuits could also be located in a control console housing 10 rather than in a separate enclosure.

A system control module 4 comprising a microprocessor 41, read-only memory (ROM) 42, random-access memory (RAM) 43, and associated control circuits, interconnected by address, data, and control buses 44, operates the input channel circuits and output channel circuits via control interface circuit 45 and a control bus 5. A console interface circuit 46 is provided to connect to a control panel 6, preferably enclosed in a separate control console 10 located remotely from the audio rack enclosure 3.

The input channel circuits 1 each provide plural adjustable signal parameters including input gain and frequency equalization (variable parameter filtering), routing assignments to one or more output channels, and signal level to the assigned output channel(s). The output channels each provide an audio bus 7 feeding in thereto for summing signals from the assigned input channels and provide adjustable output level. In a preferred embodiment, control elements for operating the sound mixing system are provided on the remote control console 10 connected to the audio rack enclosure 3 by an umbilical cable or snake 8.

Figure 2:
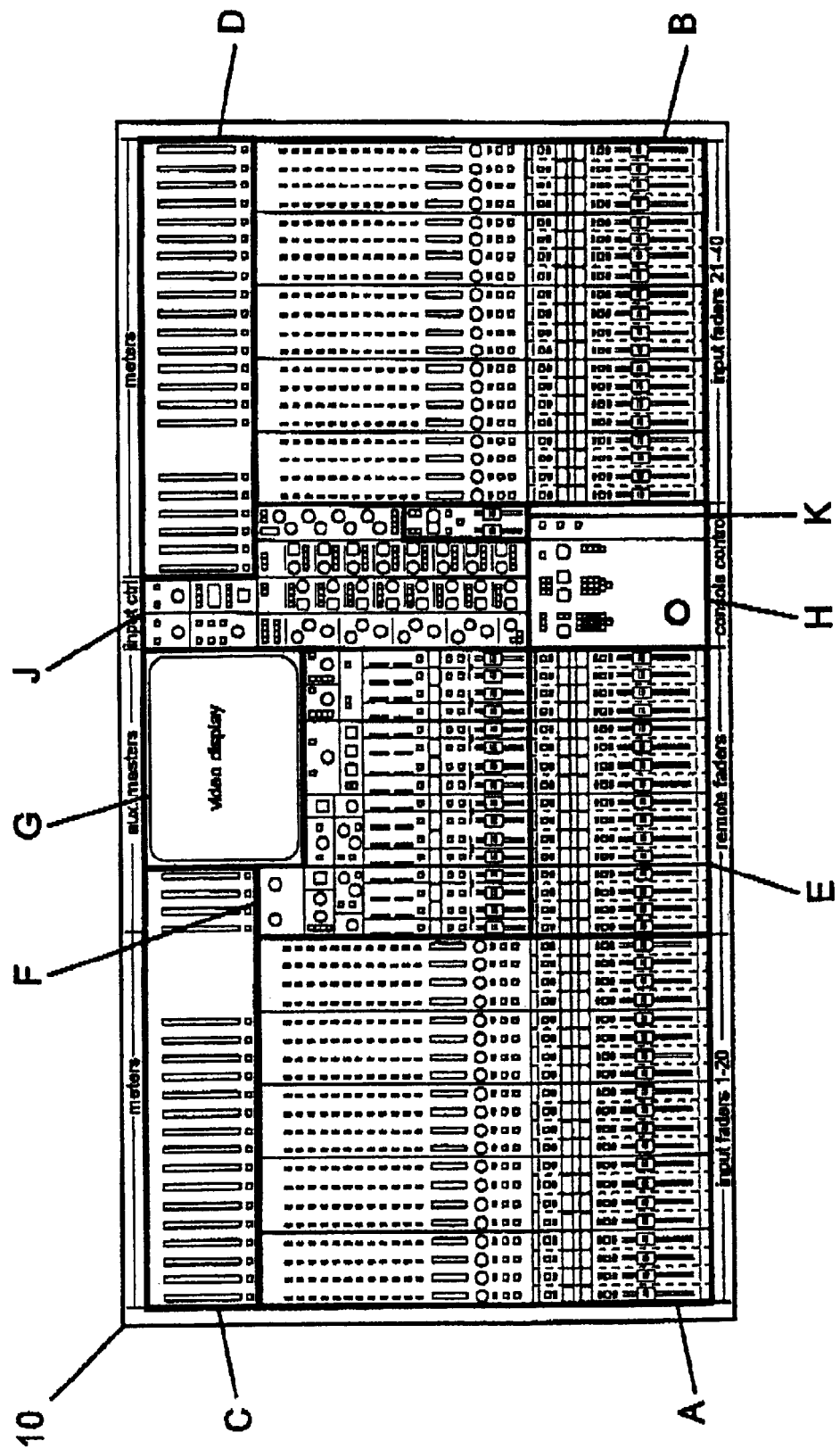
FIG. 2 is a plan view of a console control surface according to the preferred embodiment.

The control console 10 shown in FIG. 2 includes control elements for adjusting parameters associated with the input channels, including: a fader for adjusting the signal level applied to a main mixing bus; switches for selecting from among a plurality of input connections and for assigning the signal to one of plural routing assignments; and control knobs for adjusting signal conditioning parameters such as input gain, amplitude compression or limiting, gating, frequency equalization, and for adjusting auxiliary signal levels to one or more auxiliary mixing buses. Control elements and associated indicators are arranged on the console 10 in groups, as follows: input channel controls A at the left-hand side of the console and input channel controls B at the right-hand side of the console; audio signal level meters C at the upper left-hand side and audio signal level meters D at the upper right-hand side; remote channel faders E at the lower left central part of the console; auxiliary master channel controls F at the left central part; a video display unit G at the upper central part; a console control section H at the lower right central part; a master channel control section J at the right central part of the console; and stereo master output controls K located at the right central part of the console adjacent the console control section H and master channel control sections J.

A fader is provided for each set of input channel controls, and is preferably motorized as shown, for example, by Suzuki in U.S. Pat. No. 5,060,272; or by Martinson in U.S. Pat. Nos. 5,102,373; 5,122,720; and 5,293,102. A SELECT or channel selector switch is provided for each of two audio input channels that can be operated by the set of controls, illustratively switching between audio input channel 1 or audio input channel 41. Indicators are provided for each set of input channel controls and are arranged to indicate signal routing status and signal level data.

Figure 3:
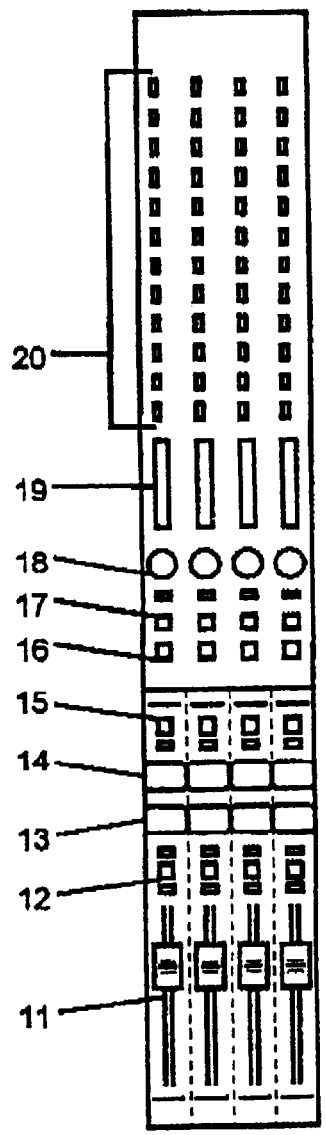
FIG. 3 is a detail view of input channel controls.

Input channel control section A includes controls for a plurality of audio input channels, illustratively shown as 20 identical sets of controls. Input channel control section B illustratively includes 20 more identical sets of controls. Each set of controls illustratively includes two SELECT switches for selecting one of two audio input channels that can be operated by the set of controls. The console then provides 40 sets of input channel controls for operating up to 80 audio input channels. As shown in FIG. 3, each set of controls includes a motorized fader 11, two SELECT switches 12, 15, two multi-character electronic display units 13, 14, a SOLO switch 16, a MUTE switch 17, an assignable control knob 18, an LED bar-graph meter 19, and an assortment of LED indicators 20 used for showing the current status of channel effects and routing assignments. When pressed, the SELECT switch 12 (or 15, depending upon which switch has been pressed) lights to indicate that the corresponding audio input channel has been selected.

Each set of input channel controls could easily be provided with more than two SELECT switches and multi-character displays for operating 120 or even 160 audio input channels with the 40 sets of input channel controls. Alternatively, each input channel control section A and B could be provided with more than 20 sets of input channel controls, for example 24 sets of controls per section, for operating 96, 144, or even 192 audio input channels using only 48 sets of controls. For convenience, however, only 40 sets of input channel controls are shown and only two SELECT switches are provided for each set. Additional audio input channels over and above the 80 channels provided for above are selected via features provided in a console control section H described below.

Audio signal level meters C and D are arranged to show the signal levels of auxiliary master buses, stereo master output buses, and monitor output buses. Remote fader section E provides 20 additional faders, each having two SELECT switches and two multi-character electronic displays, the remote faders being used for grouping certain input channels together to control their signal levels more easily.

Auxiliary master section F provides 16 sets of controls for operating 32 auxiliary master buses that can be used for a variety of purposes including plural monitor mixes or recording sends. A pair of switches is provided for selecting auxiliary master buses 1–16 or buses 17–32. Each pair of auxiliary master controls can be operated in a stereo mode in which the odd-numbered auxiliary master becomes a left-channel master while the adjacent even-numbered master becomes a right-channel master. Each set of auxiliary master controls includes SELECT, SOLO, and MUTE switches, and further includes a multi-character electronic display for labelling the auxiliary master bus. Auxiliary master section F also includes additional controls and indicators for operating other console and system features including a test oscillator/noise generator, a talk-back system, monitor sends and the like.

A video display unit G is provided for interface with functions of a computer system used as the system control element of the sound mixing system; is used during a show to display information such as a song list with notes, MIDI effects information, console set-up store and recall information; and can be used to graphically display current settings of a channel, user-specified default information, and special setting pages for advanced users.

Console control section H includes controls for operating the sound mixing system in different modes, including store and recall of console set-ups including the operational state of the faders, knobs, and switches provided thereon. The console control section H further includes switches for selecting audio input channels 1–80, 81–160, or 161–240 for operation by the 40 sets of input channel controls in sections A and B.

A stereo master control section K provides a pair of motorized faders for controlling the output level of a stereo master output mix, and further includes switches for selecting among a plurality of separate stereo master output mixes. Two, multi-character electronic displays are provided for labelling the stereo master output buses.

Figure 4:
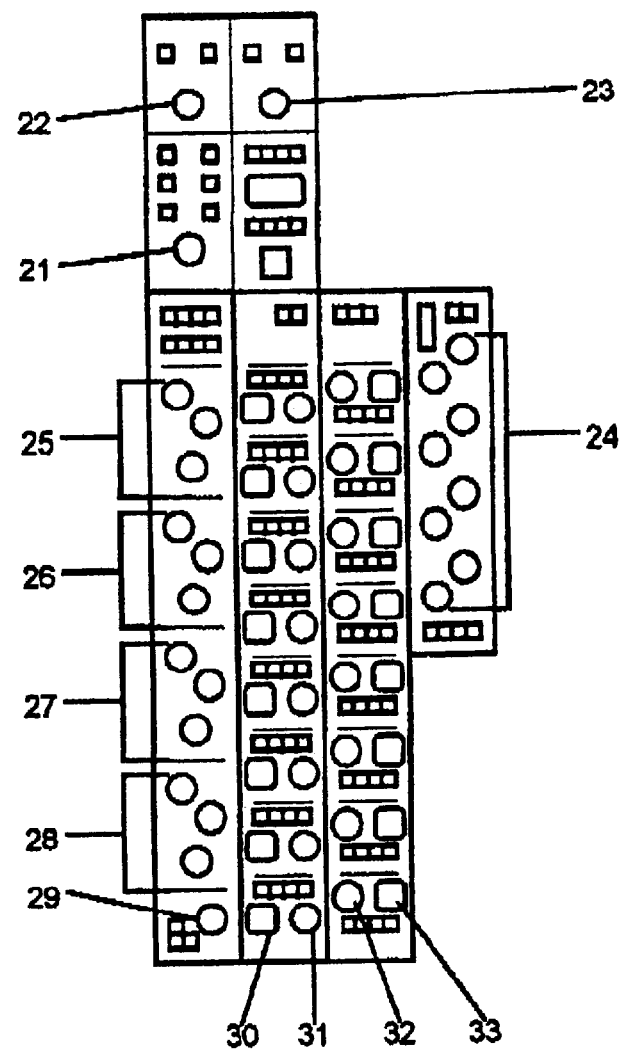
FIG. 4 is a detail view of a master channel control section of the console.

A master control section J as shown in FIG. 4 includes a plurality of operators comprising a set of control knobs for adjusting input gain, frequency equalization and the like, which can be applied to any one of the various input channels in turn for adjusting signal conditioning parameters and auxiliary signal levels. Each of the control knobs of the master control section is similarly motorized so that upon selection of a desired input channel by pressing the corresponding SELECT switch 12 or 15 on the set of input channel controls in section A or B, the various knobs in section J conform to positions that correspond to the current parameters or signal levels for the selected channel. The control system (CPU 41) of the preferred embodiment may recall from the electronic memory sub-system (RAM 43) plural set-ups of the control console. The various parameters and levels can then be adjusted manually and may also be stored in the electronic sub-system memory as an update or amendment of the original set-up or as part of a new set-up since the system provides electronic detection of movable control element positions. Each input channel can be adjusted in turn using a single set of motorized controls.

In a preferred embodiment as shown in FIG. 4, knob 21 controls the input gain of a selected input channel and knob 22 controls panoramic placement in stereo. Knob 23 controls the signal level of a direct output. Control knobs 24 control various signal parameters related to the operation of a compressor/limiter and a gate, with associated switches for selecting compressor/limiter or gate control functions and indicators for showing the extent of compression/limiting or the threshold level of the gate. Control knobs 25 adjust the signal level (boost/cut), center frequency and band width of a parametric audio filter in a high band of audio frequencies. Control knobs 26 similarly adjust a parametric audio filter in a high-mid band while knobs 27 adjust a parametric audio filter in a low-mid band and knobs 28 adjust a parametric audio filter in a low band of audio frequencies. Control knob 29 adjusts the corner frequency of a high-pass audio filter. Control knobs 31 and 32 adjust signal level to a pair of auxiliary master buses, and can be operated in a stereo mode in which knob 31 controls the signal level while knob 32 controls a pan between left and right channels. Multi-character display units 30 and 33 can be used to label the auxiliary master buses. These auxiliary master "sends" are repeated up the console so as to provide eight pairs of control knobs and associated displays and, when coupled with page select switches in a conventional manner, can be used to send a signal from a selected audio input channel to any of 32 auxiliary master buses.

While a preferred embodiment illustratively shows 40 motorized knobs in master control section J, it should be recognized that the basic concept can be practiced with fewer control knobs in a sound mixing system that provides fewer auxiliary sends, simpler audio filters, and/or simpler channel dynamics (compressor/limiter or gate). Alternatively, a greater number of motorized control knobs could be provided in a sound mixing system having more extensive signal processing features.

A principal advantage obtained hereby is that when an audio input channel is selected for adjustment of its various parameters by pressing a corresponding SELECT switch in input channel controls section A or B, the control knobs of master control section J quickly assume positions corresponding to the current values of circuit parameters controlled thereby, and are immediately responsive to manual manipulation for further adjustment. This arrangement eliminates any confusion as to what the current parameters are since they are indicated by the positions of the knobs. When the knobs are subsequently manipulated by the operator, the circuit parameters change immediately and can be stored in the electronic memory (RAM 43) as an edit to the current set-up or as part of a new set-up. As shown, a comparatively vast array of switches, indicators, and motorized control knobs is provided and can be applied to any audio input channel. The parameters controlled thereby are infrequently used, typically being adjusted for optimal performance within a given set-up and usually being adjusted one channel at a time in a rehearsal situation in which all audio input channels except the one being adjusted can be muted. There is, therefore, no particular necessity for having that vast array of controls present and active on all 40 sets of input channel controls. This being the case, it now becomes feasible to motorize all of the control knobs corresponding to these audio signal parameters since only one set of knobs is required regardless of the total number of audio input channels supported by the sound mixing system. Further, if adjustment of any of the audio signal parameters controlled by the knobs of master control section J is required during a live concert performance, access to the desired signal parameters is easily obtained simply by pressing the SELECT switch of the corresponding input channel control and turning the appropriate control knobs, without any tedious multi-level menu-based selection process such as is commonly found in advanced, digitally controlled studio consoles and without any counter-intuitive manipulation of the control knob to reset its position to one that corresponds to the present value of the signal parameter.

In accordance with another aspect of the preferred embodiment, the features of the control console, and especially the features of master control section J, are laid-out in a naturally understood arrangement that groups the control knobs according to their function. Audio filter controls 25–29 are laid-out in a vertically arranged strip, as are channel dynamics control knobs 24. Auxiliary master send controls 30–33 are grouped in pairs and laid-out in vertically arranged strips. Input control knobs 21–23 are grouped together at the top of the console between the video display G and the meter section D so that critical controls such as input gain 21 and pan 22, and their associated switches, are easily accessible. In this way, a new user is immediately familiar with the layout of controls on this new sound mixing control console, and does not experience the effects of a "learning curve" such as encountered with other recent sound mixing control consoles, especially the consoles for controlling digital audio systems found in recording studios and the like. This is a special advantage for large-scale, "live" concert sound mixing applications, in which there is frequently no opportunity for a sound mixing engineer to become familiar with the layout of a new control console.

Those skilled in the art will appreciate that various substitutions, omissions, modifications and changes may be made in the method and apparatus of the present invention without departing from the scope or spirit thereof. Accordingly, it is intended that the forgoing description be considered merely exemplary of the present invention and not a limitation thereof. Therefore, the above-described embodiments are merely examples of how the invention may be carried out and other ways may also be possible which are within the scope of the following claims.

We claim:

1. A sound mixing control console comprising:

a plurality of input channels having signal processing functions applied thereto by a plurality of signal processing units;

a first plurality of controls for adjusting signal levels of the plurality of input channels;

a second plurality of controls for adjusting a plurality of variable signal conditioning parameters, each of said second plurality of controls being assigned to one of the plurality of variable signal conditioning parameters of said signal processing functions;

a plurality of channel selectors for selecting one of said input channels to be controlled in dependence upon operation of said second plurality of controls;

memory for storing operation positions of said second plurality of controls;

control system for recalling operation position information stored in said memory with respect to the input channel selected by said channel selectors and for positioning said second plurality of controls to said positions; and said signal processing units adjusting the input signal in correspondence to the positions of said second plurality of controls with respect to the input channel selected by one of said plurality of channel selectors.

2. The system of claim 1, wherein said second plurality of controls is laid out in vertically arranged strips.

3. The system of claim 1, wherein said second plurality of controls is grouped according to their function.

4. The system of claim 1, wherein said second plurality of controls is grouped in pairs and laidout in vertically arranged strips.

5. The system of claim 1, wherein the signal processing units are computer-controlled digital signal processor devices.

6. The system of claim 1, wherein the signal processing units are digitally-controlled analog audio circuits.

7. The system of claim 1, the memory storing operation positions for each of said plurality of input channels.

8. The system of claim 1, wherein said plurality of variable parameters include input gain and frequency equalization.

9. The system of claim 1, further comprising:

display for indicating which of said plurality of input channels is selected to be controlled by said second plurality of controls.

10. The system of claim 1, wherein the first plurality of controls are configured to be driven by at least one of a manual adjustment of the control and a motor coupled to the control.

11. The system of claim 1, wherein the second plurality of controls are configured to be driven by at least one of a manual adjustment of the control and a motor coupled to the control.

12. The system of claim 1,
wherein the first plurality of controls and the second plurality of controls allows simultaneous access to adjust signal levels to a main mixing bus of the plurality of input channels and the plurality of variable signal conditioning parameters of a selected input channel.

13. The system of claim 1,
wherein the first plurality of controls adjusts only signal levels to a main mixing bus of the plurality of input channels; and
wherein the second plurality of controls adjusts the variable signal conditioning parameters of the input channel selected, the variable signal conditioning parameters comprising at least one or more of a group comprising an input gain, a panoramic placement in stereo, a signal level of a direct output, a compressor operation, a limiter operation, a gate operation, the signal level, center frequency, and bandwidth of a parametric audio filter in a high band of audio frequencies, the signal level, center frequency, and bandwidth of a parametric audio filter in a high-mid band of audio frequencies, the signal level, center frequency, and bandwidth of a parametric audio filter in a low-mid band of audio frequencies, the signal level, center frequency, and bandwidth of a parametric audio filter in a low band of audio frequencies, the corner frequency of a high-pass audio filter, and the signal level and pan of a channel routed to an auxiliary bus.

14. A sound mixing control console comprising:
a plurality of input channels having signal processing functions applied thereto by a signal processing means;
a first plurality of controls for adjusting signal levels of the plurality of input channels;
a second plurality of controls for adjusting a plurality of variable signal conditioning parameters, each of said second plurality of controls being assigned to one of the plurality of variable signal conditioning parameters of said signal processing functions;
means for selecting one of said input channels to be controlled in dependence upon operation of said second plurality of controls;
means for storing operation positions of said second plurality of controls;
means for recalling operation position information stored in said means for storing with respect to the input channel selected by said means for selecting and for positioning said second plurality of controls to said positions; and
said signal processing means adjusting the input signal in correspondence to the positions of said second plurality of controls with respect to the input channel selected by said means for selecting.

15. The system of claim 14,
wherein the first plurality of controls are configured to be driven by at least one of a manual adjustment of the control and a motor coupled to the control.

16. The system of claim 14,
wherein the second plurality of controls are configured to be driven by at least one of a manual adjustment of the control and a motor coupled to the control.

17. The system of claim 14,
wherein the first plurality of controls and the second plurality of controls allows simultaneous access to adjust signal levels of the plurality of input channels to a main mixing bus and the plurality of variable signal conditioning parameters of a selected input channel.

18. The system of claim 14,
wherein the first plurality of controls adjusts only signal levels of the plurality of input channels; and
wherein the second plurality of controls adjusts the variable signal conditioning parameters of the input channel selected, the variable signal conditioning parameters comprising at least one or more of a group comprising an input gain, a panoramic placement in stereo, a signal level of a direct output, a compressor operation, a limiter operation, a gate operation, the signal level, center frequency, and bandwidth of a parametric audio filter in a high band of audio frequencies, the signal level, center frequency, and bandwidth of a parametric audio filter in a high-mid band of audio frequencies, the signal level, center frequency, and bandwidth of a parametric audio filter in a low-mid band of audio frequencies, the signal level, center frequency, and bandwidth of a parametric audio filter in a low band of audio frequencies, the corner frequency of a high-pass audio filter, and the signal level and pan of a channel routed to an auxiliary bus.

19. A method of mixing sound comprising:
selecting one of a plurality of input channels to be controlled in dependence upon operation of a first plurality of operators and a second plurality of operators, wherein the first plurality of operators controls input channel signal levels of said input channels and each of the second plurality of operators controls one of a plurality of variable signal conditioning parameters of the selected input channel;
automatically recalling operation position information stored in memory with respect to the input channel selected and positioning said second plurality of operators to said position;
adjusting the plurality of variable signal conditioning parameters by adjustment of the position of said second plurality of operators with respect to the channel selected by one of a plurality of channel selectors; and
adjusting the input signal level by adjustment of the position of one of said first plurality of operators corresponding to the channel selected by one of the plurality of channel selectors.

* * * * *